United States Patent [19]
Bellisio

[11] 4,215,245
[45] Jul. 29, 1980

[54] VARIABLE RATE SYNCHRONOUS DIGITAL TRANSMISSION SYSTEM

[75] Inventor: Jules A. Bellisio, Wall Township, Monmouth County, N.J.

[73] Assignee: Bell Telephone Laboratories, Incorporated, Murray Hill, N.J.

[21] Appl. No.: 974,375

[22] Filed: Dec. 29, 1978

[51] Int. Cl.² .............................................. H04L 7/02
[52] U.S. Cl. ..................................... 370/84; 375/120; 371/47
[58] Field of Search ........ 179/15 BV, 15 AT, 15 BA; 178/69.1; 364/200, 900

[56] References Cited

U.S. PATENT DOCUMENTS

| | | | |
|---|---|---|---|
| Re. 29,215 | 5/1977 | Carney | 179/15 BV |
| 3,548,309 | 12/1970 | Saltzberg | 179/15 BV |
| 3,665,405 | 5/1972 | Sanders | 179/15 BV |
| 3,809,820 | 5/1974 | Sullivan | 179/15 BV |
| 3,909,791 | 9/1975 | van den Berg | 364/200 |

Primary Examiner—David L. Stewart
Attorney, Agent, or Firm—Sylvan Sherman

[57] ABSTRACT

A synchronous digital transmission system (12), operating over a prescribed range of bit rates, is interfaced with subscribers (10, 11) whose data sources and receivers have different bit rates by means of transmitter and receiver interface networks (13, 14). The transmitter interface network (13) comprises means (20, 21, 23, 24) for phase-locking an integral subharmonic $f_o/N$ of a variable frequency oscillator (22) to an input clock signal, $f_1$, associated with an input data stream, and means (25, 27) for encoding the data stream for operation at a bit rate corresponding to the fundamental frequency, $f_o$, of the local oscillator (22) and including one code violation at a prescribed rate, $f_1/M$, related to the input clock frequency $f_1$. The receiver interface network (14) includes means (30, 31, 32) for decoding the received signal and for recovering the input data stream and clock signal.

3 Claims, 5 Drawing Figures

VARIABLE RATE SYNCHRONOUS DIGITAL TRANSMISSION SYSTEM

TECHNICAL FIELD

The invention relates to digital transmission systems and, in particular, to synchronous digital transmission systems capable of interfacing with input data streams having widely different data rates.

BACKGROUND OF THE INVENTION

The rapid growth of computer technology and the proliferation of data terminals among widely scattered telephone company subscribers has given rise to a need to provide efficient means for interconnecting these subscribers. The difficulty resides in the fact that the subscribers' terminals operate at widely varying data rates. In the past, this suitation has typically been handled by either providing each subscriber with a separate transmission link for each different terminal speed, or by using a common, untimed digital line for all the terminals. The former solution is clearly uneconomical. The latter solution is equally unsatisfactory in that the errors in a repeatered but untimed system tends to accumulate, thus limiting the length of line over which data can be efficiently transmitted.

SUMMARY OF THE INVENTION

The present invention is a synchronous digital transmission system adapted to interface with data sources and receivers operating at arbitrarily different data rates. The system is characterized by a transmitter interface network and a receiver interface network. The transmitter interface includes means for phase-locking an integral subharmonic of a variable frequency local oscillator to an input clock signal associated with an input data stream, and means for encoding the data stream for operation at a bit rate corresponding to the fundamental frequency of said local oscillator, and including one code violation at a prescribed rate that is related to the input clock frequency. At the receiver end of the system, the receiver interface includes means for recovering the original clock frequency, and means for decoding said encoded signal and recovering the input data stream and clock signal.

It is an advantage of the invention that its operation is fully automatic, requiring no adjustments as the data rate is changed.

DETAILED DESCRIPTION

Figure 1:
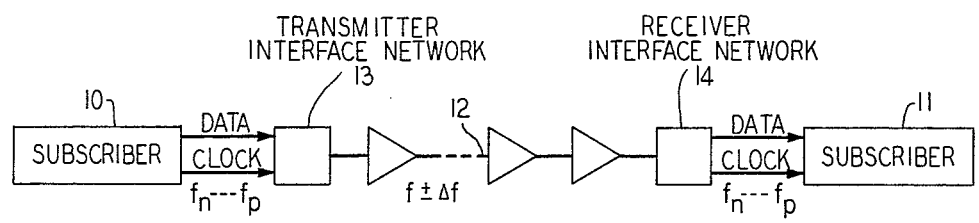
FIG. 1 illustrates the type of data transmission system to which the invention relates.

Referring to the drawings, FIG. 1 illustrates the type of data transmission system to which the invention relates. Typically, the system comprises a first subscriber 10 coupled by means of a repeatered, data transmission line 12 to a second, remote subscriber 11. The problem is that the data signals originated by subscriber 10 operate over a range of bit rates $f_n \ldots f_p$ which are lower and occupy a much wider range than the range of operating rates $f \pm \Delta f$ of the high capacity transmission line 12 connecting the two subscribers.

In order to accommodate these subscribers, in accordance with the present invention, a transmitter interface network 13 is interposed between subscriber 10 and the transmission line. This network is designed to accept the customer's unrestricted data and associated clock signals, and to convert the respective input signals to a data stream that is consistent with the operating characteristics of the high capacity transmission line. At the output end of line 12, a receiver interface network 14 recovers both the original data and its associated clock in phase lock with its source. All of the data encoding and decoding, and all of the clock synchronization are done automatically, requiring no adjustments by either of the subscribers.

Figure 2:
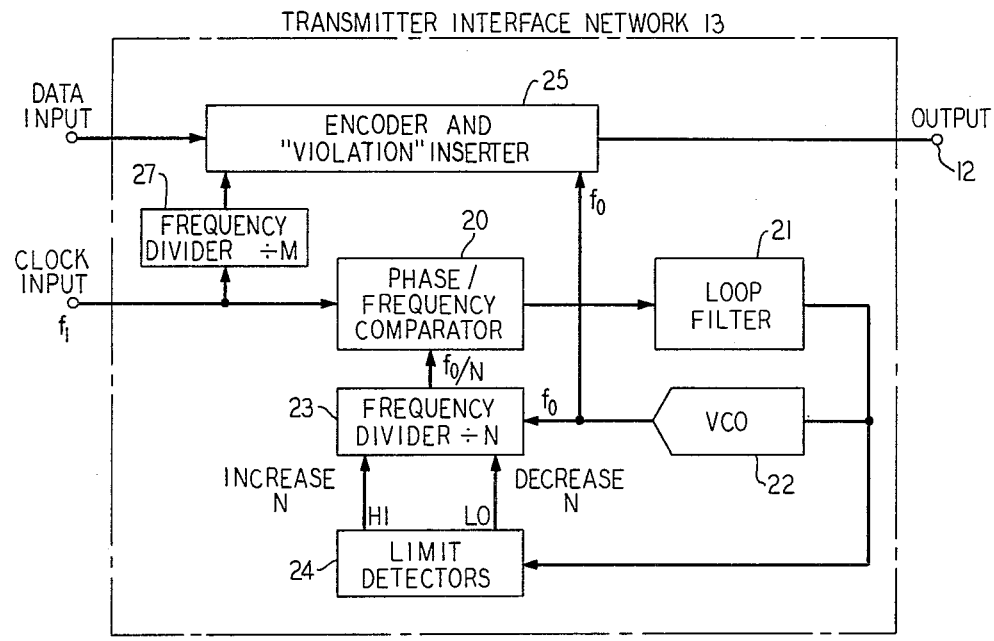
FIG. 2 shows, in block diagram, an illustrative embodiment of a transmitter interface network.
Figure 3:
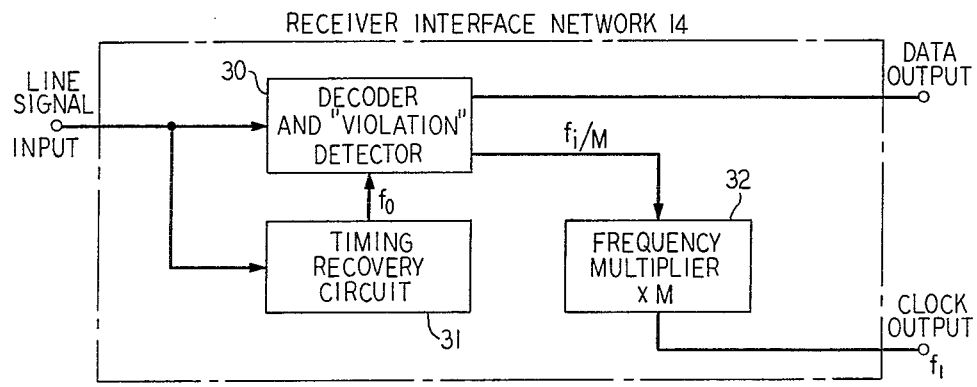
FIG. 3 shows, in block diagram, an illustrative embodiment of a receiver interface network.

FIG. 2 shows, in block diagram, one embodiment of transmitter interface network (13) for interfacing between subscribers whose digital data signals have arbitrary bit rates, and a repeatered digital transmission line designed to operate within a relative narrow range of higher bit rates. The transmitter interface performs two basic functions. The first, performed by a multifrequency phase-locked loop, adjusts the frequency of a local oscillator to an integral harmonic of the subscriber's clock frequency, which harmonic also falls within the bit rate range $f \pm \Delta f$ of the transmission line. The second function is to encode the subscriber's signal to insure an adequate signal density for recovering timing information, regardless of the input signal pattern. In addition, the code must provide information to permit the receiver to recover the original clock signal. This is done, in accordance with the present invention, by including a code "violation" at a known rate relative to the subscriber's clock frequency.

The first of these functions is performed by a multifrequency phase-locked loop comprising a phase/frequency comparator 20, a loop filter 21, a voltage controlled oscillator (VCO) 22, a frequency divider 23, and limit detectors 24.

The second of these functions is performed by an encoder and violation inserter 25, and a frequency divider 27.

In operation, the subscriber's clock signal, at frequency $f_1$, is applied to comparator 20 along with a subharmonic $f_o/N$ of the local oscillator 22. An error signal, proportional to the difference between the two frequencies, is produced and fed back to the local oscillator through loop filter 21, which may include an integrator. If the difference between the subscriber's clock frequency and the local oscillator subharmonic falls within the adjustment range of the oscillator, the frequency/phase error signal adjusts the VCO frequency directly so as to minimize the error. If, however, the adjustment is beyond the range of the oscillator, this is sensed by the limit detectors 24, which respond by causing the frequency division ratio N to increase or decrease. For example, if $f_o/N \gg f_1$, i.e., $f_o$ is too high, the HI limit detector is activated and slowly increases the division ratio N one step at a time. This decreases $f_o/N$ until the difference $f_o/N - f_1$ falls within the adjustment range of the oscillator. Similarly, if $f_o/N \gg f_1$, the LO limit detector causes the division ratio to be decreased. In either case, once the division ratio places the oscillator within the adjustment range, phase lock occurs.

Simultaneously, the subscriber's data stream is coupled to encoder and violation inserter 25 along with the output signal from oscillator 22 which, as explained above, is an integral multiple of, and is phase-locked to the subscriber's clock frequency. The encoder converts each input bit into a block of bits for transmission along line 12 at the line bit rate $f_o$. The encoded signal must also convey information about the subscriber's clock frequency. This is achieved in association with frequency divider 27 which couples a subharmonic of the subscriber's clock signal to the "violation" inserter circuit which, in response, generates a code violation at a rate that is a subharmonic $f_1/M$ of the input clock frequency.

At the output end of line 12, the receiver interface network 14 comprises a decoder and violation detector 30, a timing recovery circuit 31, and a frequency multiplier 32. In operation, the line signal is coupled to decoder 30 and timing recovery circuit 31. The line clock signal, $f_o$, derived the the timing recovery circuit is used to retime and decode the input signal, thereby recovering the subscriber's data signal. The violation detector simultaneously produces a signal at the known subharmonic $f_1/M$ of the subscriber's clock frequency. The latter is recovered by passing the violation detector signal through frequency multiplier 32, which can be the same type of multifrequency PLL as in the transmitter interface network.

While the present invention can be practiced using any one of the many known encoding schemes, the particular one selected should, advantageously, facilitate timing recovery, provide d.c. balance, and result in no decoding ambiguities even when there is a code violation. One encoding scheme which satisfies these preferred characteristics encodes a "1" alternately as 11 or 00. A "0" is encoded as a 10. Thus, for example, if the frequency division ratio N is 6, a "1" in the subscriber's data signal is initially converted to 111. The latter is then encoded as 110011. Similarly, a "0" is converted initially to 000, and then encoded as 101010. Applying these rules to an illustrative subscriber's signal of 1101, the line encoded signal would be 110011 001100 101010 110011. A violation would consist in not alternating between 11 and 00 in the case of a "1", or in reversing the bits in the case of a "0". Thus, in the above example, a violation in the first encoded group might appear as 111111 or as 110000. In the third group, a violation might appear as 100110, or as 101001, depending upon the timing of the violation. It will be noted that a violation which converts a 00 to a 11, or a 11 to 00 does not create an ambiguity since both sets of symbols represent a "1". Similarly, a violation which converts a 10 or 01 creates no ambiguity since 01 does not represent any other data symbol. In addition, alternating between ones and zeros, in the manner described, makes timing recovery easy as there can be no long intervals of zeros. Similarly, by alternating a good d.c. balance is maintained.

The particular encoding scheme described is the so-called "biphase space" code described in NASA Technical Memorandum X-64615 entitled "A Survey of Digital Baseband Signaling Techniques" by H. L. Deffebach and W. O. Frost, dated June 30, 1971. However, it is apparent that any other convenient encoding can just as readily be employed.

Figure 4:
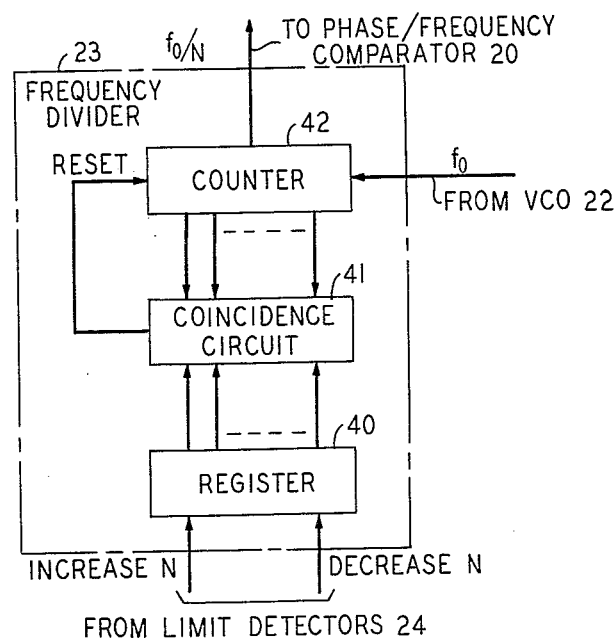
FIG. 4 shows, in block diagram, an illustrative embodiment of a frequency divider.

FIG. 4 shows one embodiment of a frequency divider that can be used in the transmitter interface circuit of FIG. 2. The illustrative divider comprises a register 40, which stores an integral number N which is communicated to a coincidence logic circuit 41. The divider further includes a counter 42, whose count is also communicated to logic circuit 41.

In operation, counter 42 counts the bits received from VCO 22, which arrive at the rate of $f_o$ per second. Every time the count reaches the particular number N stored in register 40, the logic circuit causes the counter to generate an output pulse which, accordingly, occurs at a rate of $f_o/N$ per second. If, during the course of operation, a "decrease-N" or an "increase-N" signal is received by divider 23, the number N stored in register 40, and communicated to the coincidence circuit 41, is changed, causing a corresponding change in the output frequency of the divider.

Figure 5:
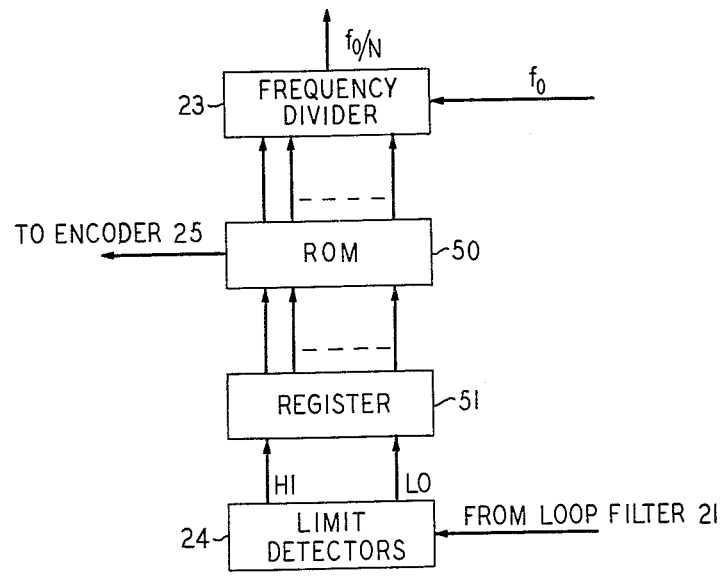
FIG. 5 shows a modification of the frequency divider of FIG. 4.

In the description given above with respect to the operation of divider 23, a step-by-step change in N is contemplated. That is, if N is too low, it will increase by unit increments (i.e., N+1, N+2 ...) until the proper value is reached. However, in practice, a subscriber will know the clock rates of his equipment, in which case only specific values of N will ever be used. In this case, the circuit can be modified, as illustrated in FIG. 5, by the inclusion of a read-only memory (ROM) 50 and a register 51 between the limit detectors 24 and divider 23. The ROM serves to store information about the values of N that are of interest. For example, a particular subscriber may only require N values of 1, 3, 6 and 8. In such a case, the system is programmed such that inputs to the ROM from register 51 of 1, 2, 3 or 4 cause outputs from the former of 1, 3, 6 and 8, respectively.

The ROM in FIG. 5 is also shown to have an output going to encoder 25. Whether there is a need for such an output will depend upon the particular encoding scheme selected. In the instant case, each bit is encoded as two bits. While this presents no problem when N is an even number, this encoding cannot be used directly when N is odd. To accommodate an odd N, the encoder is modified such that adjacent input data bits are encoded such that the first of each pair of bits is encoded as if the frequency division ratio is N−1, and the second bit is encoded as if the ratio is N+1. For example, if N is 7, pairs of bits are encoded as if N was alternatively 6 and 8. Thus, on average, the ratio for pairs of bits is 7. Accordingly, whenever the output from ROM 50 (or register 40, if no ROM is used) is odd, a signal is communicated to the encoder to switch encoding modes as required.

In summary, the invention is a synchronous digital transmission system capable of accepting and transmitting input data over a range of speeds spanning many decades. By means of a transmitter interface network, the input data is encoded into a format that is consistant with the characteristics of the transmission line. The encoded signal can be retimed and regenerated using standard regenerators operating within a small increment of a single fixed baud. At the receiver, a receiver interface network recovers both the original clock and data signals. The interface networks operate automatically so that no adjustments need be made when changing data rates.

I claim:

1. A synchronous digital transmission system (12) adapted to operate over a prescribed range of bit rates and to interface with data sources having different data rates, CHARACTERIZED IN THAT said system comprises:

a transmitter interface network (13) including:

means (20, 21, 23, 24) for phase-locking an integral subharmonic of a variable frequency local oscillator (22) to the clock signal frequency, $f_1$, of an input data stream, where the range of frequencies of said oscillator falls within the prescribed range of bit rates of said system; and means (25, 27) for encoding said data stream for operation at a bit rate equal to the frequency of said oscillator and including one code violation at a rate related to the clock signal frequency;

and a receiver interface network including:

means (31, 32) for decoding said encoded data stream and for recovering the original input data stream and clock signal.

2. The system according to claim 1 wherein said phase-locking means is a phase-locked loop comprising:

a phase/frequency comparator (20) for comparing the frequencies and phases of an input clock signal and a subharmonic of said local oscillator, and for producing an error signal which is a function of their difference;

means, including a loop filter (21), for coupling said error signal to said oscillator for varying the frequency of said oscillator;

a frequency divider (23) for producing a subharmonic of the oscillator signal and for coupling said subharmonic to said comparator (20);

and limit detectors (24) for varying the division ratio of said divider (23) whenever said error signal exceeds predefined limits.

3. The system according to claim 1 wherein said code violation occurs at a rate equal to a subharmonic of the clock signal frequency.

* * * * *